Patented Aug. 28, 1934

1,971,409

UNITED STATES PATENT OFFICE

1,971,409

AROYLENE-BIS-ACETIC ACID-ARYLIDES

Franz Henle and Herbert Kracker, Frankfort-on-the-Main-Hochst, Germany, assignors to General Aniline Works, Inc., New York, N. Y., a corporation of Delaware No Drawing. Application January 6, 1933, Serial No. 650,588. In Germany September 9, 1930

6 Claims. (Cl. 260—124)

The present invention relates to aroylene-bis-acetic acid-arylides, more particularly it relates to compounds of the following general formula:

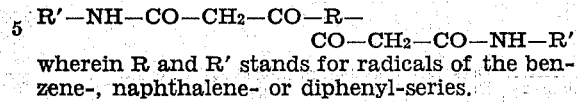

wherein R and R' stands for radicals of the benzene-, naphthalene- or diphenyl-series.

This application is a continuation-in-part application to our copending application Serial No. 591,444, filed February 6, 1932.

We have found that the hitherto unknown aroylene-bis-acetic acid-arylides (wherein the term "aroylene" means the radical —CO—R—CO— of an aromatic dicarboxylic acid) may be obtained, for instance, by condensing the aroylene-bis-acetic acid-esters (obtainable by condensation of aromatic dicarboxylic acid chlorides with aceto-acetic acid-esters, according to the statements in "Journal für praktische Chemie", vol. 74, pages 124 to 126, and subsequent acid cleavage) with aromatic amines, for instance, according to the statements in "Annalen der Chemie", vol. 245, page 372, relating to the preparation of benzoyl-acetic acid-anilide or according to the statements in British Patent No. 16928 of 1912, relating to the manufacture of o-substitution products of aceto-acetic acid anilide and its homologues.

The new compounds are distinguished by a high affinity for the vegetable fiber and are valuable intermediates for the production of azo-dyestuffs.

The following examples serve to illustrate the invention, but they are not intended to limit it thereto, the parts being by weight:

(1) 306 parts of terephthaloyl-bis-acetic acid-ethyl-ester (obtainable, for instance, according to the statements in "Journal für praktische Chemie", vol. 74, pages 124 to 126), and 186 parts of aniline are heated in an oil-bath. Vivid reaction sets in between 135° C. and 140° C. and alcohol escapes with strong frothing of the melt. A yellow crystalline body separates from the melt which is at first clear, and the mass becomes more and more viscous. When the frothing has ceased, the reaction mixture has solidified to a brittle, dark-yellow crystalline mass. The temperature is maintained for ½ hour at 140° C. and, thereupon, the whole is allowed to cool. The body is dissolved in hot dilute caustic soda solution, and after filtration, the hot solution is acidified by means of hydrochloric acid. There is obtained the terephthaloyl-bis-acetic acid-anilide in the form of a yellowish crystalline powder which melts at 230° C. to 231° C.

It corresponds to the formula:

(2) 306 parts of terephthaloyl-bis-acetic acid-ethyl-ester, 376 parts of 1-amino-3-chloro-4.6-dimethoxybenzene and 1500 parts of xylene are heated to boiling. The ethyl-alcohol, formed during the reaction, is distilled off, the solution is allowed to cool and the terephthaloyl-bis-acetic acid-3-chloro-4.6-dimethoxy-1-anilide which has separated in the form of crystals is filtered by suction. It forms in the dry state a yellow crystalline powder which melts at 268° C. to 269° C. The compound dissolves to a light-yellow solution in organic solvents and in aqueous caustic alkalies.

Instead of xylene, there may be used any other, high-boiling, indifferent solvent, as, for instance, toluene, chlorobenzene, solvent naphtha, nitrobenzene and others.

Instead of terephthaloyl-bis-acetic acid-ester, there may be used any homologue, as, for instance, chloroterephthaloyl-bis-acetic acid-ester, naphthoylene-bis-acetic acid-ester, biphenyl-4.4'-dicarbonyl-bis-acetic acid-ester or the like which may be obtained, for instance, in a manner analogous to the preparation of terephthaloyl-bis-acetic acid-ester according to the statements in "Journal für praktische Chemie", vol. 74, pages 124 to 126 by starting from the corresponding aromatic dicarboxylic acid chloride and aceto-acetic acid-ester.

Instead of 1-amino-3-chloro-4.6-dimethoxybenzene, there may be used any other base. Thus, there are obtained in an analogous manner by starting, for instance from

| | | |
|---|---|---|
| Terephthaloyl-bis-acetic acid-ester and | | |
| o-chloroaniline | Terephthaloyl-bis-acetic-acid-o-chloroanilide | Yellow crystals, melting at 208° C. to 209° C. |
| p-anisidine | Terephthaloyl-bis-acetic acid-p-anisidide | Yellow crystals, melting at 242° C. to 243° C. |
| o-toluidine | Terephthaloyl-bis-acetic acid-o-toluidide | Feebly yellowish crystals, melting at 225° C. to 226° C. |
| α-naphthylamine | Terephthaloyl-bis-acetic acid-α-naphthylamide | Yellow crystals, melting at 257° C. to 258° C. |
| β-naphthylamine | Terephthaloyl-bis-acetic acid-β-naphthylamide | Yellow crystals, melting at 250° C. to 251° C. |
| 2.5-dichloro-aniline | Terephthaloyl-bis-acetic acid-2.5-dichloroanilide | White needles, melting at 239° C. to 240° C., |
| 1-amino-2-methyl-4-chloro-benzene | Terephthaloyl-bis-acetic acid-2-methyl-4-chloro-1-anilide | Feebly yellowish small crystals, melting at 273° C. to 274° C., |
| 1-amino-2-methoxy-5-chloro-benzene | Terephthaloyl-bis-acetic acid-2-methoxy-5-chloro-1-anilide | Yellowish crystals, melting at 252° C. to 253° C.,0 |
| m-nitraniline | Terephthaloyl-bis-acetic acid-m-nitranilide | Dark yellow crystals, melting at 249° C. to 250° C. |
| p-toluidine | Terephthaloyl-bis-acetic acid-p-toluidide | Yellowish crystals, melting at 244° C. to 245° C. |
| 1-amino-4-chloro-2.5-dimethoxy-benzene | Terephthaloyl-bis-acetic acid-4-chloro-2.5-dimethoxy-1-anilide | Dark yellow crystals, melting at 267° C. to 268° C. |
| 1-amino-2-methoxy-4-chloro-benzene | Terephthaloyl-bis-acetic acid-2-methoxy-4-chloro-1-anilide | Yellow crystals, meltnig at 249° C. to 250° C. |
| 1-amino-4-chloro-2-methoxy-5-methylbenzene | Terephthaloyl-bis-acetic acid-4-chloro-2-methoxy-5-methyl-1-anilide | Light-yellow crystals, melting at 265° C. to 266° C. |
| p-aminodiphenyl | Terephthaloyl-bis-acetic acid-p-aminodiphenyl | Yellow crystalline powder, melting at above 310° C. |
| Isophthaloyl-bis-acetic acid-ester and | | |
| Aniline | Isophthaloyl-bis-acetic acid-anilide | Pale-yellow crystals, melting at 186° C. to 187° C. |
| o-chloroaniline | Isophthaloyl-bis-acetic acid-o-chloroanilide | Pale-yellow crystals, melting at 152° C. to 153° C. |
| Biphenyl-4.4'-dicarbonyl-bis-acetic acid-ester and | | |
| Aniline | Biphenyl-4.4'di-carbonyl-bis-acetic acid-anilide | Dark yellow crystals, melting at 235° C. to 236° C. |
| 1-amino-4-chloro-2-methoxybenzene | Biphenyl-4.4-dicarbonyl-bis-acetic acid-4-chloro-2-methoxy-1-anilide | Dark yellow crystals, melting at 237° C. to 238° C. |
| Nitro-terephthaloyl-bis-acetic acid-ester and | | |
| o-toluidine | Nitro-terephthaloyl-bis-acetic acid-o-toluidide | Yellow crystals, melting at 272° C. to 273° C. |
| o-anisidine | Nitro-terephthaloyl-bis-acetic acid-o-anisidide | Yellow crystals, melting at 264° C. to 265° C. |
| Chloro-terephthaloyl-bis-acetic acid-ester and | | |
| 1-amino-2-methoxy-4-chloro-benzene | Chloro-terephthaloyl-bis-acetic acid-2-methoxy-4-chloro-1-anilide | Light-yellow crystals, melting at 276° C. to 277° C. |
| 1-amino-4-chloro-2.5-dimthoxy-benzene | Chloro-terephthaloyl-bis-acetic acid-4-chloro-2.5-dimethoxy-1-anilide | Yellow crystals, melting at 294° C. to 295° C. |
| Naphthoylene-1.5-bis-acetic acid-ester and | | |
| Aniline | Naphthoylene-1.5-bis-acetic acid-anilide | Yellow crystals, melting at 295° C. to 296° C. |
| o-chloroaniline | Naphthoylene-1.5-bis-acetic acid-o-chloro-anilide | Yellow crystals, melting at 302° C. to 303° 3. |

We claim:

1. The compounds of the following general formula:

R'—NH—CO—CH₂—CO—R—CO—CH₂—CO—NH—R' wherein R and R' stand for radicals of the benzene-, naphthalene- or diphenyl-series, being crystallized yellow compounds soluble in organic solvents and in aqueous alkali with a yellow color and being distinguished by a high affinity for the vegetable fiber.

2. The compounds of the following general formula:

R'—NH—CO—CH₂—CO—R—CO—CH₂—CO—NH—R' wherein R stands for a radical of the benzene series, R' stands for a radical of the benzene-, naphthalene- or diphenyl series, being crystallized yellow compounds soluble in organic solvents and in aqueous alkali with a yellow color and being distinguished by a high affinity for the vegetable fiber.

3. The compounds of the following general formula:

R'—NH—CO—CH₂—CO—R—CO—CH₂—CO—NH—R' wherein R and R' stand for radicals of the benzene series, being crystallized yellow compounds soluble in organic solvents and in aqueous alkali with a yellow color and being distinguished by a high affinity for the vegetable fiber.

4. The terephthaloyl-bis-acetic acid-2-methoxy-4-chloro-1-anilide of the following formula:

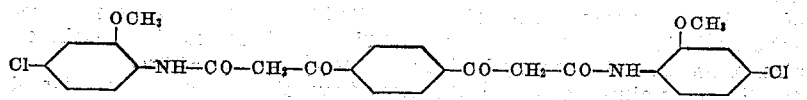

representing yellow crystals which melt at 249° C. to 250° C. and being distinguished by a high affinity for the vegetable fiber.

5. The terephthaloyl-bis-acetic acid-3-chloro-4.6-dimethoxy-1-anilide of the following formula:

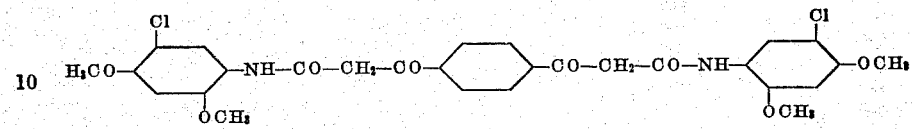

representing a yellow crystalline powder which melts at 268° C. to 269° C. and being distinguished by a high affinity for the vegetable fiber.

6. The terephthaloyl-bis-acetic acid-4-chloro-2-methoxy-5-methyl-1-anilide of the following formula:

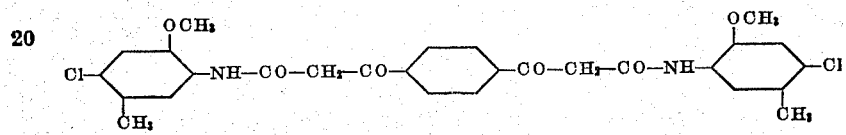

representing a light yellow crystalline powder which melts at 265° C. to 266° C. and being distinguished by a high affinity for the vegetable fiber.

FRANZ HENLE.
HERBERT KRACKER.